United States Patent
Choi et al.

(10) Patent No.: US 6,538,367 B1
(45) Date of Patent: Mar. 25, 2003

(54) FIELD EMITTING DEVICE COMPRISING FIELD-CONCENTRATING NANOCONDUCTOR ASSEMBLY AND METHOD FOR MAKING THE SAME

(75) Inventors: Kyung Moon Choi, Scotch Plains, NJ (US); Sungho Jin, Millington, NJ (US); Gregory Peter Kochanski, Dunellen, NJ (US); Wei Zhu, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/369,802

(22) Filed: Aug. 6, 1999

Related U.S. Application Data (60) Provisional application No. 60/144,277, filed on Jul. 15, 1999.

(51) Int. Cl.[7] ................................................. H01J 1/02
(52) U.S. Cl. ........................ 313/309; 313/495; 313/308
(58) Field of Search ................................. 313/309, 306, 313/307, 308, 495, 496

(56) References Cited

U.S. PATENT DOCUMENTS

| | | | | |
|---|---|---|---|---|
| 5,583,393 A | * | 12/1996 | Jones .......................... | 313/495 |
| 5,773,921 A | | 6/1998 | Keesmann et al. .......... | 313/309 |
| 5,872,422 A | | 2/1999 | Xu et al. ..................... | 313/311 |
| 5,973,444 A | * | 10/1999 | Xu et al. ..................... | 313/309 |
| 6,057,637 A | * | 5/2000 | Zettl et al. .................. | 313/310 |
| 6,097,138 A | * | 8/2000 | Nakamoto .................. | 313/309 |
| 6,250,984 B1 | * | 6/2001 | Jin et al. ..................... | 445/51 |
| 6,278,231 B1 | * | 8/2001 | Iwasaki et al. .............. | 313/310 |
| 6,283,812 B1 | * | 9/2001 | Jin et al. ..................... | 445/24 |
| 6,286,226 B1 | * | 9/2001 | Jin ............................... | 33/706 |
| 6,297,063 B1 | * | 10/2001 | Brown et al. ............... | 438/2 |
| 6,297,592 B1 | * | 10/2001 | Goren et al. ................ | 315/3.5 |
| 6,322,713 B1 | * | 11/2001 | Choi et al. ................... | 216/38 |
| 6,340,822 B1 | * | 1/2002 | Brown et al. ............... | 257/25 |

FOREIGN PATENT DOCUMENTS

| | | | |
|---|---|---|---|
| EP | 0913508 A2 | * | 4/1999 |
| JP | 10050240 A | * | 2/1998 |
| JP | 11111161 A | * | 9/1999 |

* cited by examiner

*Primary Examiner*—Ashok Patel
*Assistant Examiner*—Kevin Quarterman
(74) *Attorney, Agent, or Firm*—Lowenstein Sandler PC

(57) ABSTRACT

This invention is predicated on applicants' discovery that a highly oriented nanoconductor structure alone does not guarantee efficient field emission. To the contrary, the conventional densely populated, highly oriented structures actually yield relatively poor field emission characteristics. Applicants have determined that the individual nanoconductors in conventional assemblies are so closely spaced that they shield each other from effective field concentration at the ends, thus diminishing the driving force for efficient electron emission.

In accordance with the invention, an improved field emitting nanoconductors assembly (a "low density nanoconductor assembly") comprises an array of nanoconductors which are highly aligned but spaced from each other no closer than 10% of the height of the nanoconductors. In this way, the field strength at the ends will be at least 50% of the maximal field concentration possible. Several ways of making the optimally low density assemblies are described along with several devices employing the assemblies.

8 Claims, 12 Drawing Sheets

FIELD EMITTING DEVICE COMPRISING FIELD-CONCENTRATING NANOCONDUCTOR ASSEMBLY AND METHOD FOR MAKING THE SAME

CROSS REFERENCE TO RELATED APPLICATIONS

This application claims the benefit of U.S. Provisional Application No. 60/144,277 of identical title filed by the present inventors on Jul. 15, 1999.

FIELD OF INVENTION

This invention pertains to field emitting devices and, in particular, to field emitting devices comprising field-concentrating nanoconductor assemblies and to methods for making such devices.

BACKGROUND OF THE INVENTION

Field emitting devices are useful in a wide variety of applications. A typical field emitting device comprises a field emitting assembly composed of a cathode and a plurality of field emitter tips. The device also typically includes a grid closely spaced to the emitter tips and an anode spaced further from the cathode. Voltage induces emission of electrons from the tips, through the grid, toward the anode. Applications include flat panel displays, klystrons and traveling wave tubes, ion guns, electron beam lithography, high energy accelerators, free electron lasers, and electron microscopes and microprobes. One of the most promising applications is thin, matrix-addressed flat panel displays. See, for example, *Semiconductor International*, December 1991, p.46; C. A. Spindt et al., *IEEE Transactions on Electron Devices*, vol. 38, pp. 2355 (1991); I. Brodie and C. A. Spindt, *Advances in Electronics and Electron Physics*, edited by P. W. Hawkes, vol. 83, pp. 1 (1992); and J. A. Costellano, *Handbook of Display Technology*, Academic Press, New York, pp. 254 (1992), all of which are incorporated herein by reference.

A conventional field emission flat panel display comprises a flat vacuum cell having a matrix array of microscopic field emitters formed on a cathode and a phosphor coated anode disposed on a transparent front plate. An open grid (or gate) is disposed between cathode and anode. The cathodes and gates are typically intersecting strips (usually perpendicular) whose intersections define pixels for the display. A given pixel is activated by applying voltage between the cathode conductor strip and the gate conductor. A more positive voltage is applied to the anode in order to impart a relatively high energy (400–5,000 eV) to the emitted electrons. For additional details see, for example, the U.S. Pat. Nos. 4,940,916; 5,129,850; 5,138,237 and 5,283,500, each of which is incorporated herein by reference.

A variety of characteristics are advantageous for field emitting assemblies. The emission current is advantageously voltage controllable, with driver voltages in a range obtainable from "off the shelf" integrated circuits. For typical CMOS circuitry and typical display device dimensions (e.g. 1 $\mu$m gate-to-cathode spacing), a cathode that emits at fields of 25 V/$\mu$m or less is generally desirable. The emitting current density is advantageously in the range of 1–10 mA/cm$^2$ for flat panel display applications and >100 mA/cm$^2$ for microwave power amplifier applications. The emission characteristics are advantageously reproducible from one source to another and advantageously stable over a long period of time (tens of thousands of hours). The emission fluctuations (noise) are advantageously small enough to avoid limiting device performance. The cathode should be resistant to unwanted occurrences in the vacuum environment, such as ion bombardment, chemical reaction with residual gases, temperature extremes, and arcing. Finally, the cathode manufacturing is advantageously inexpensive, e.g. devoid of highly critical processes and adaptable to a wide variety of applications.

Previous cathode materials are typically metal (such as Mo) or semiconductor (such as Si) with sharp tips. While useful emission characteristics have been demonstrated for these materials, the control voltage required for emission is relatively high (around 100 V) because of their high work functions. The high control voltage increases damage due to ion bombardment and surface diffusion on the emitter tips and necessitates high power densities to produce the required emission current density. The fabrication of uniform sharp tips is difficult, tedious and expensive, especially over a large area. In addition, these materials are vulnerable to deterioration in a real device operating environment involving ion bombardment, chemically active species and temperature extremes.

Diamond emitters and related emission devices are disclosed, for example, in U.S. Pat. Nos. 5,129,850, 5,138,237, 5,616,368, 5,623,180, 5,637,950 and 5,648,699 and in Okano et al., *Appl. Phys. Lett.* vol. 64, p. 2742 (1994), Kumar et al., *Solid State Technol.* vol. 38, p. 71 (1995), and Geis et al., *J. Vac. Sci. Technol.* vol. B14, p. 2060 (1996), all of which are incorporated herein by reference. While diamond field emitters have negative or low electron affinity, the technology has been hindered by emission non-uniformity, vulnerability to surface contamination, and a tendency toward graphitization at high emission currents (>30 mA/cm$^2$).

Nanoscale conductors ("nanoconductors") have recently emerged as potentially useful electron field emitters. Nanoconductors are tiny conductive nanotubes (hollow) or nanowires (solid) with a size scale of the order of 1.0–100 nm in diameter and 0.5–10 $\mu$m in length. Carbon nanotubes, which are representative, are a stable form of carbon which features high aspect ratios (>1,000) and small tip radii of curvature (1–50 nm). These geometric characteristics, coupled with the high mechanical strength and chemical stability, make carbon nanotubes especially attractive electron field emitters. Carbon nanotube emitters are disclosed, for example, by T. Keesmann in German patent No. 4,405,768, and in Rinzler et al., *Science*, vol. 269, p.1550 (1995), De Heer et al., *Science*, vol. 270, p. 1179 (1995), Saito et al., *Jpn. J. Appl. Phys.* Vol. 37, p. L346 (1998), Wang et al., *Appl. Phys. Lett.*, vol. 70, p. 3308, (1997), Saito et al., *Jpn. J. Appl. Phys.* Vol. 36, p. L1340 (1997), Wang et al., *Appl. Phys. Lett.* vol. 72, p 2912 (1998), and Bonard et al., *Appl. Phys. Lett.*, vol. 73, p. 918 (1998), all of which are incorporated herein by reference. The synthesis of conductive nanowires based on semiconductor materials such as Si or Ge has also been reported. See, for example, A. M. Morales et al. *Science*, Vol. 279, p. 208 (1998), which is incorporated herein by reference.

Nanoconductors are which are grown in the form of randomly oriented, needle-like or spaghetti-like powders that are not easily or conveniently incorporated into a field emitter device. Due to this random configuration, the electron emission properties are not fully utilized or optimized. Many nanoconductor tips may be buried in the mass. Ways to grow nanoconductors in an oriented fashion on a substrate are disclosed in Ren et al., *Science*, Vol. 282, p. 1105 and Fan et al., *Science*, Vol. 283, p. 512, both of which are incorporated herein by reference.

SUMMARY OF THE INVENTION

This invention is predicated on applicants' discovery that a highly oriented nanoconductor structure alone does not guarantee efficient field emission. To the contrary, the conventional densely populated, highly oriented structures actually yield relatively poor field emission characteristics. Applicants have determined that the individual nanoconductors in conventional assemblies are so closely spaced that they shield each other from effective field concentration at the ends, thus diminishing the driving force for efficient electron emission.

In accordance with the invention, an improved field emitting nanoconductors assembly (a "low density nanoconductor assembly") comprises an array of nanoconductors which are highly aligned but spaced from each other an average distance of at least 10% of the average height of the nanoconductors and preferably 50% of the average height. In this way, the field strength at the ends will be at least 50% of the maximal field concentration possible. Several ways of making the optimally low density assemblies are described along with several devices employing the assemblies.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that the drawings are for purposes of illustrating the concepts of the invention and are not to scale.

DETAILED DESCRIPTION

This disclosure is divided into two parts. Part I describes the problem of poor nanoconductor field emission performance and discloses low density nanoconductor assemblies as a solution to this problem, along with several methods of making the low-density assemblies. Part II describes improved devices using the low-density assemblies and methods for making the improved devices.

I. Improved Nanotube Assemblies

Applicants have discovered that despite their promising features for field emission, some conventionally fabricated nanoconductor assemblies perform poorly as field emission devices. For example, CVD grown carbon nanotube assemblies have highly oriented nanotubes of small diameter (0.8–1.3 nm) which provide effective field concentration and provide a high concentration of tube ends exposed to the assembly surface. Nonetheless emission results are poor. The devices exhibit high emission threshold fields and provide low current density.

Applicants have further discovered that nanoconductor assembly performance, including emission current density, can be enhanced by reducing the surface density of the nanoconductors. It was hypothesized that in conventional assemblies the density of highly oriented nanoconductors was too high. The nanoconductors were too closely spaced and this close spacing reduced the field concentration at the emitting ends.

Figure 1A:
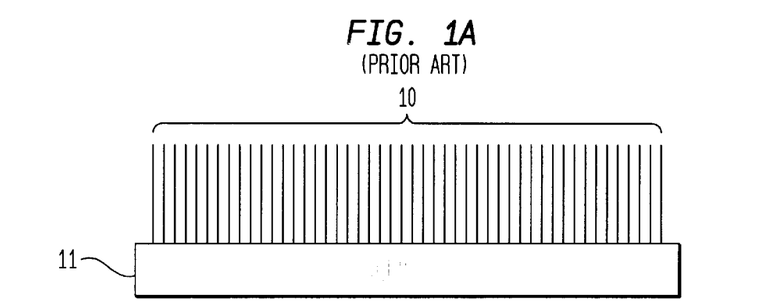
FIGS. 1(a) and 1(b) illustrate pertinent features of conventional nanoconductor assemblies.
Figure 1B:
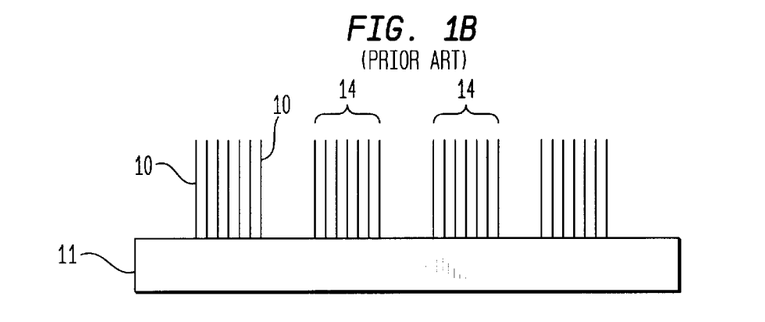

Qualitatively, this problem can be visualized by reference to FIGS. 1(a) and 1(b) which schematically illustrate prior art nanoconductor assemblies having a high density of oriented conductors. The aligned nanoconductors 10 extend from the surface of a substrate 11. In FIG. 1(a) the nanoconductors have a high, relatively uniform surface density. In FIG. 1(b) the nanoconductors are in clusters 14 of high surface density. The field concentration of each nanoconductor end is screened and shielded by the presence of neighboring nanoconductors.

Figure 2A:
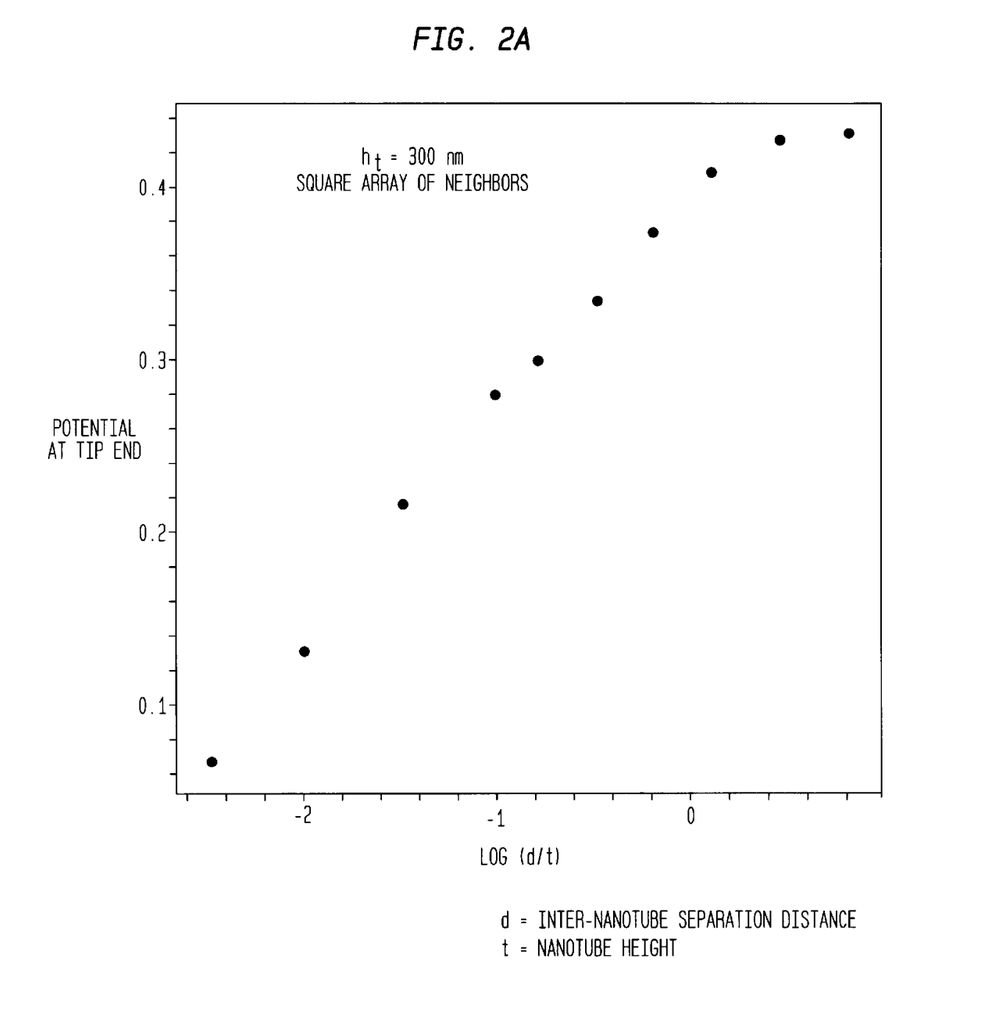
FIGS. 2(a) and 2(b) are simulation plots of electrical potential near the field emission site at the nanoconductors of an assembly as a function of the ratio of nearest neighbor distance (d) over the tube height (h).
Figure 2B:
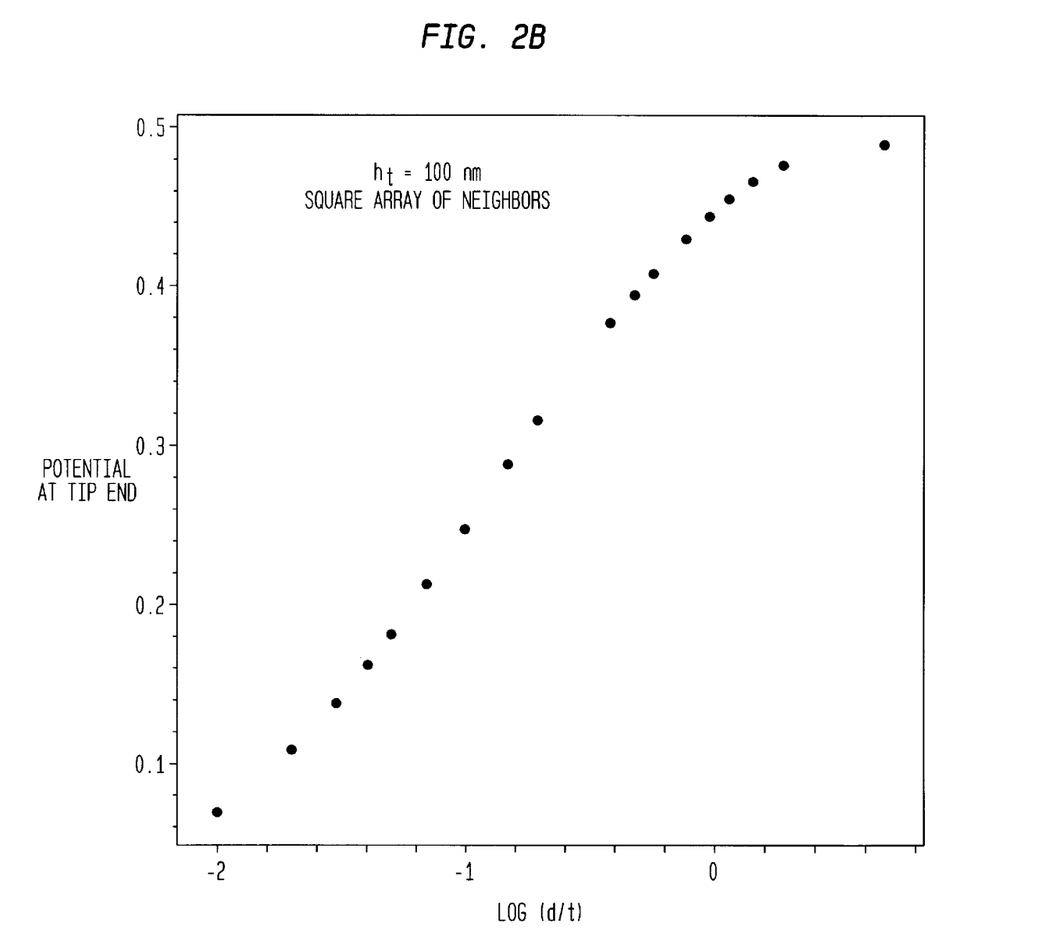

The shielding or screening effect of applied electric field from neighboring nanoconductors is calculated and illustrated in FIGS. 2(a) and 2(b). These graphs plot the potential at the end vs. the spacing/height ratio (d/h) of the conductors. It can be seen that, for d/h>2.5, the potential at the end reaches at the highest possible level, indicating fullest field concentration at the end. For d/h<2.5, the potential at the end starts to drop. At d/h=0.1, the potential is only about 65% of the maximum potential attainable for h=300 nm (FIG. 2a), and about 50% of the maximum potential attainable for h=100 nm (FIG. 2b). This suggests that when the conductor spacing is less than 2.5 times the height, neighboring conductors interfere with the field distribution and provide screening or shielding. As a result, the field concentration is reduced, and the field strength falls toward the average field determined by the voltage and the average anode-cathode separation, thus eliminating the beneficial effect of the high-aspect-ratio nanoconductor geometry.

Figure 1C:
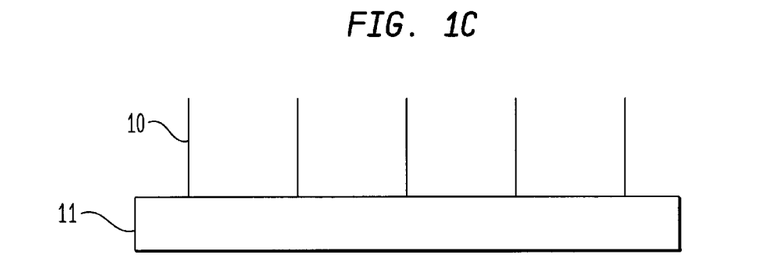
FIGS. 1(c) and 1(d) show corresponding features of low density nanoconductor assemblies.
Figure 1D:
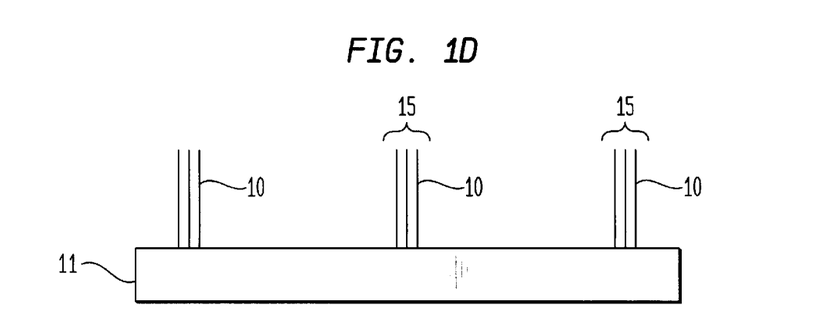

The simulation results of FIG. 2 suggest the use of low density aligned nanoconductor assemblies, such as those shown in FIGS. 1(c) and 1(d). Here the low density spacing among individual conductors 10 (FIG. 1c) or small bundles 15 (FIG. 1d) meets the general condition of d/h>0.1. In low density assemblies the field strength at the emitting ends is at least equal to or greater than ~50% of the maximum field strength achievable. The more desired d/h ratio is at least 0.2, preferably at least 0.5, and even more preferably at least 1.0. The desired field concentration at the emitting ends in the inventive structure is increased at least by a factor of 5 and preferably at least by a factor of 20 as compared to dense prior art nanoconductor assemblies.

Figure 3A:
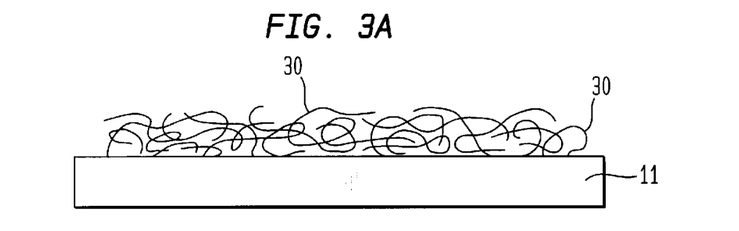
FIGS. 3–9 schematically illustrate various techniques of making low-density nanoconductor assemblies.

FIGS. 3(a)–3(d) schematically illustrate an exemplary method for making low density nanoconductor assemblies. As shown in FIG. 3(a), nanoconductor are typically deposited on substrate 11 in a mass 30 of tangled, high-aspect-ratio needles or fibers with random orientation. They can be prepared by a number of synthesis techniques including arc discharge, chemical vapor deposition and laser ablation onto a substrate or by disposing (such as through spraying) pre-formed nanoconductors onto a substrate. Single-wall carbon nanotubes typically exhibit a diameter of 0.8–6 nm and are often made in the form of a bundle. Multi-wall carbon nanotubes contain many concentric graphite sheets and typically exhibit a diameter of 5–50 nm. The aspect ratio for both types is typically 100–10,000, and both types have small-dimension, field-concentrating ends useful for electron emission.

The nanoconductors are preferably deposited on conductive substrates 11 such as metals, conductive ceramics or polymers. Desirably, the nanoconductors exhibit good adhesion to the substrate, using, for example, the techniques disclosed in copending U.S. application Ser. No. 09/236,966 by Jin et al., filed Jan. 25, 1999 and entitled "Article Comprising Enhanced Nanotube Emitter Structure and Process For Fabricating Article", which is incorporated herein by reference.

Figure 3B:
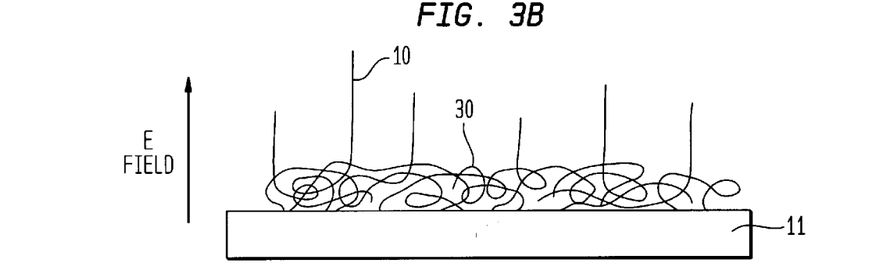
Figure 3C:
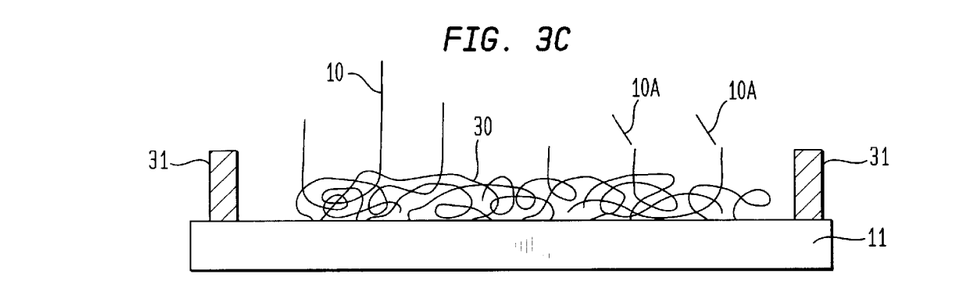
Figure 3D:
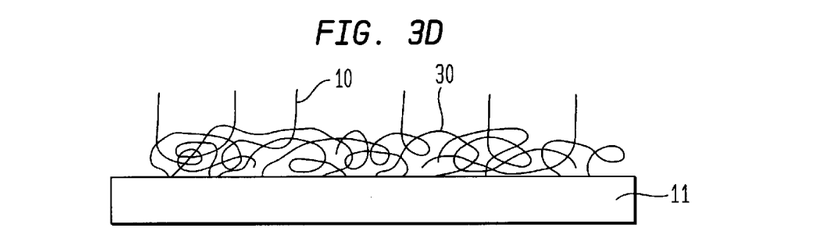

The tangled mass 30 is then subjected to an external electric field applied normal to the film surface during field emission. As shown in FIG. 3(b) loose nanoconductor ends 10 in this tangled structure will tend to stand up and align themselves with the electric field lines. As a result, we have aligned nanoconductor ends 10 exposed in the field, the density of which is low enough to meet the d/h>0.1 criterion because of the random and tangled nature of the film 30. The ends can optionally be further trimmed by, e.g. using a hot blade and spacer or using a laser beam to create aligned nanotube ends with equal height to further optimize the emission properties. Such trimming is described in greater detail in copending U.S. application Ser. No. 09/236,933 by Jin et al., filed Jan. 25, 1999 and entitled "Article Comprising Aligned, Truncated Carbon Nanotubes and Process For Fabricating Article", which is incorporated herein by reference. FIG. 3(c) illustrates trimming of excess portions 10A using spacers 31, and FIG. 3(d) shows the equal height nanoconductors 10 produced by the trimming.

The average distance d and average height h for calculating the ration d/h may be defined analytically. In the case where the nanoconductors are of substantially uniform length, the average distance $$d = \sqrt{\frac{\sigma}{\pi}},$$

where $\sigma$ is the areal number density of nanoconductors. This distance d is a typical distance from one nanoconductor to another. Where the nanoconductors are of substantially uniform length and are substantially perpendicular to the substrate, the average height h is simply the average length of the nanoconductors. If the lengths are uniform but not perpendicular to the substrate, h is the average distance of the nanoconductor tops from the substrate. Where the lengths are substantially nonuniform we can define an upper reference plane at a distance Z above the substrate, just below the tops of the tallest few nanoconductors. (These are the nanoconductors that will be emitting almost all the electrons.) Analytically we can calculate $Z=(\overline{z_i^{15}})^{1/15}$ where the heights $Z_i$ are the distances of the nanoconductor tops from the substrate and the mean $\overline{z_i^{15}}$ is taken over all nanoconductors. The value for d is calculated, as above, from the areal density of nanoconductor ends above the upper reference plane. We then define a lower reference plane at the mean height of the nanoconductor film. For a film where the nanoconductors are parallel and uniform, this plane is halfway up the nanoconductors. For a moderately disordered film, the plane is at a height of $Z=\frac{1}{2}\Sigma(Z_i)^2/\Sigma Z_i$ where the summations are taken over all nanoconductors. The average height of the nanoconductors h is then twice the distance between the upper and lower reference planes. This results in d/h ratios for disordered films that correspond well to the values for ideal ordered films. The parameters to be taken over all nanoconductors can, of course, be estimated by sampling in accordance with accepted statistical practice.

Figure 4:
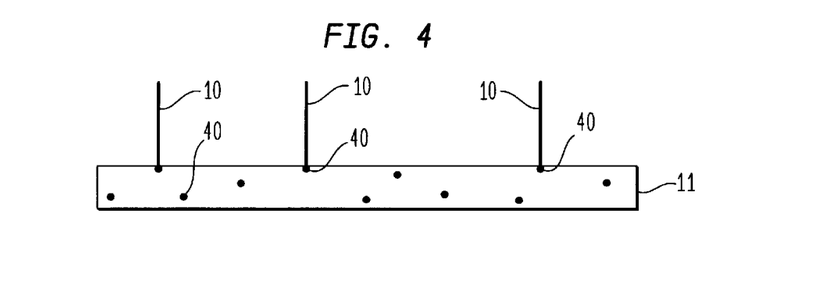

FIG. 4 presents an alternative method of making low density nanoconductor assemblies using a substrate 11 with pre-determined nucleation sites 40 exposed to the deposition environment. An exemplary substrate can be prepared by mixing metal powders, such as Cu, with fine nanoparticles of Fe, Co, Ni or their oxide particles as catalyst for nanoconductor nucleation and growth. The size of these particles is preferred in the range of 1–50 nm, more preferably in the range of 1–10 nm range. The volume percentage of the catalytic particles is preferred less than 50%, and more preferably less than 30%.

The mixture is then pressed, sintered, polished and heat treated in a reducing atmosphere such as $H_2$ or forming gas to reveal nanoparticles of Fe, Co or Ni on the surface as nucleation sites. Alternatively, the surface reduction can be performed in-situ in the deposition chamber prior to the nanoconductor growth, to avoid re-oxidation of the metal catalyst particles due to exposure to air. The nanoconductors will grow on the exposed catalytic particles with a relatively low density, partly because of the controlled volume percentage of catalytic particles contained in the alloy substrate and partly because of the substantially limited number of the catalytic particles exposed on a given sectioned or polished surface of the composite substrate material.

Figure 5A:
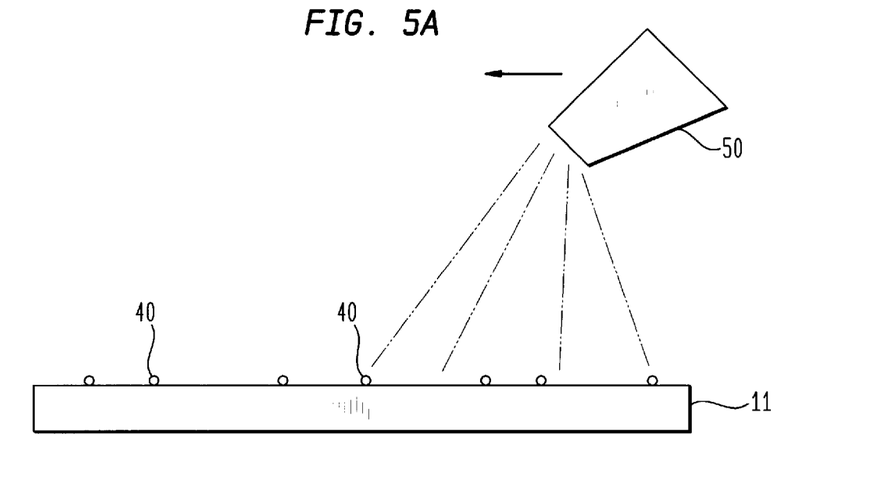
Figure 5B:
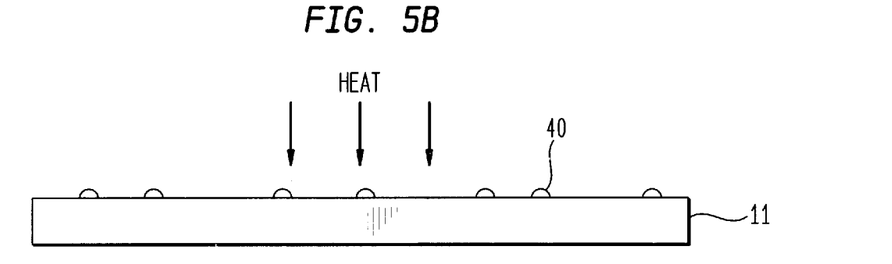
Figure 5C:
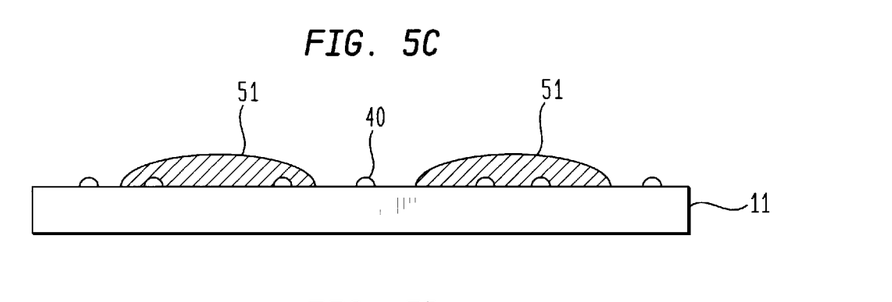
Figure 5D:
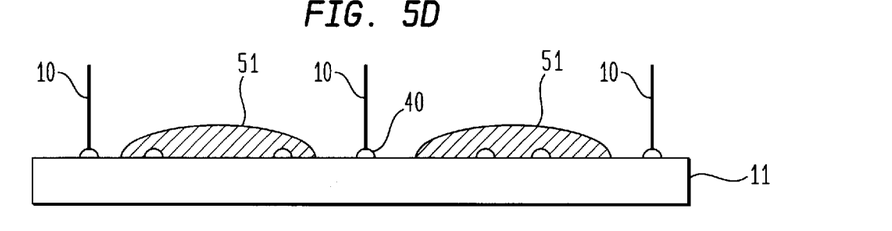

Another way of preparing a substrate with nucleation sites is illustrated in FIGS. 5(a)–5(d). As shown in FIG. 5(a), catalytic particles 40 are suspended in a colloidal or dilute solution and sprayed through a nozzle 50 onto a substrate 11. The sprayed particles are optionally diffusion bonded to the substrate by heat treatment to increase the adhesion as illustrated in FIG. 5(b). A substantial fraction of the sprayed catalytic particles are then made invalid by covering them with a non-catalytic layer 51 of metal (e.g. Cu), ceramic (e.g. $SiO_2$) or polymer to reduce the number of catalytic particles that are exposed to the surface. This is shown in FIG. 5(c). In this way, the nucleation density of nanoconductors is reduced. The overlayer can be deposited either by vacuum deposition (e.g. sputtering or evaporation) or by simple spraying. The overlayer can also be patterned lithographically, so that as shown in FIG. 5(d) the resulting low density array of nanoconductors 10 is also patterned.

Figure 6A:
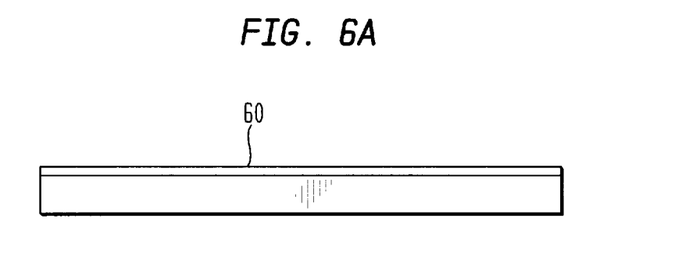
Figure 6B:
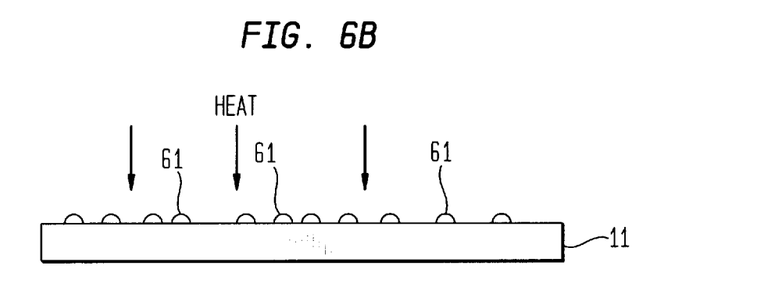
Figure 6C:
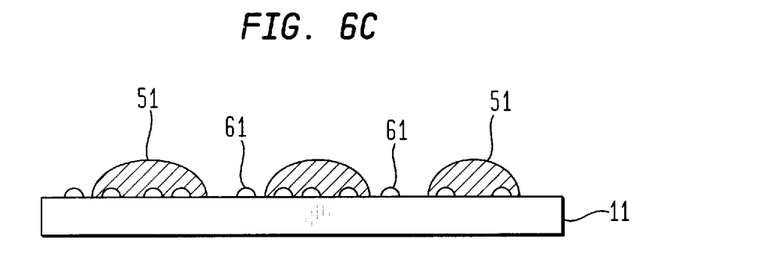
Figure 6D:
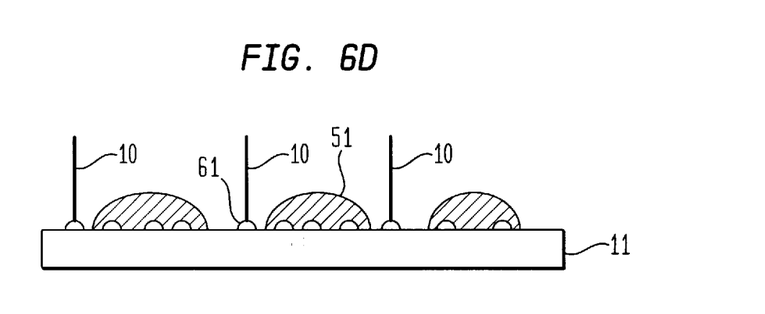

FIGS. 6(a)–6(d) present yet another way of preparing a substrate with nucleation sites. Here, the catalyst metals (such as Fe, Co, Ni) are deposited onto a substrate as a thin film 60, e.g., a film with a thickness in the range of 1–20 nm, by either chemical vapor deposition, electrochemical deposition or physical vapor deposition techniques. The substrate 11 is preferably a conductive material with a large mismatch in lattice constant with respect to that for the catalyst metal film. The large mismatch will create large strains in the catalyst metal film. The deposited film is then subject to a high temperature heat treatment, e.g. 200–600° C. for 0.1–10 hours, preferably in an inert or vacuum environment. As shown in FIG. 6(b) formation of islands 61 will be induced during this heat treatment in order to reduce the strain and overall energy in the film 60. These fine islands 61 will serve as nucleation sites for the carbon nanotubes. To reduce the density of nanoconductors, a fraction of these catalyst islands can be covered by a non-catalytic layer 51 as shown in FIG. 6(c). The nanoconductors 10 are then selectively grown on these limited number of catalyst particles by using known methods such as chemical vapor deposition (FIG. 6(d)).

Figure 7A:
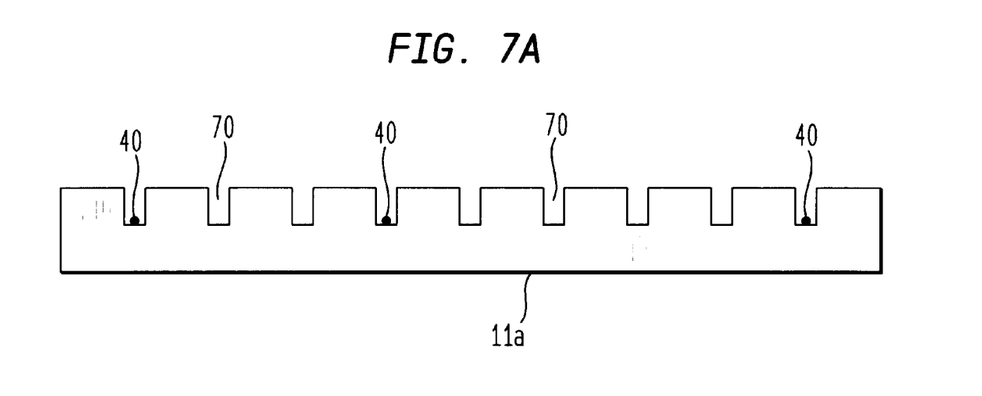
Figure 7B:
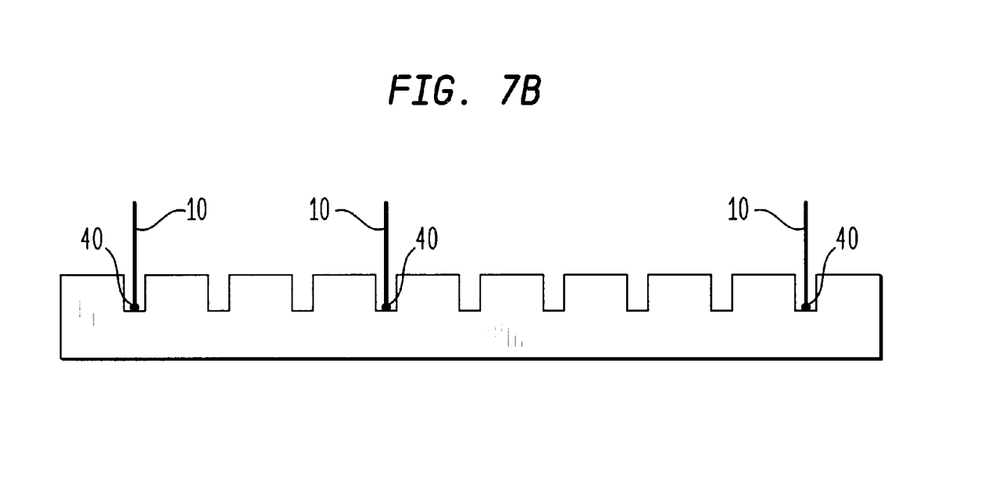

The density of nanoconductors can also be controlled by selectively filling catalyst particles 40 into a porous substrate 11A as illustrated in FIG. 7(a). Here, nanoporous materials such as porous silicon or silica are used as substrate 11A with only a small fraction of its available pores 70 filled with catalyst particles 40. The pores 70 are preferably open pores, more preferably surface recessed pores, with the size in the range of 1–100 nm. The filling of catalyst particles can be accomplished by short-duration vacuum deposition, pressurized slurries, or via electrochemical means. As shown in FIG. 7(b) the nanoconductors 10 will nucleate and grow only from the pores possessing catalyst particles. The nanoconductors will generally tend to align themselves due to the limitation placed by the vertically configured pore geometry. Electric fields can optionally be applied during the growth for further alignment.

Figure 8A:
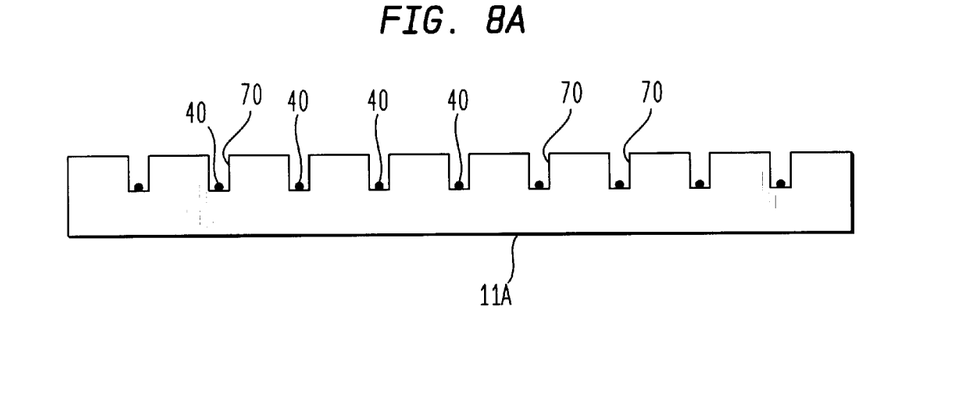
Figure 8B:
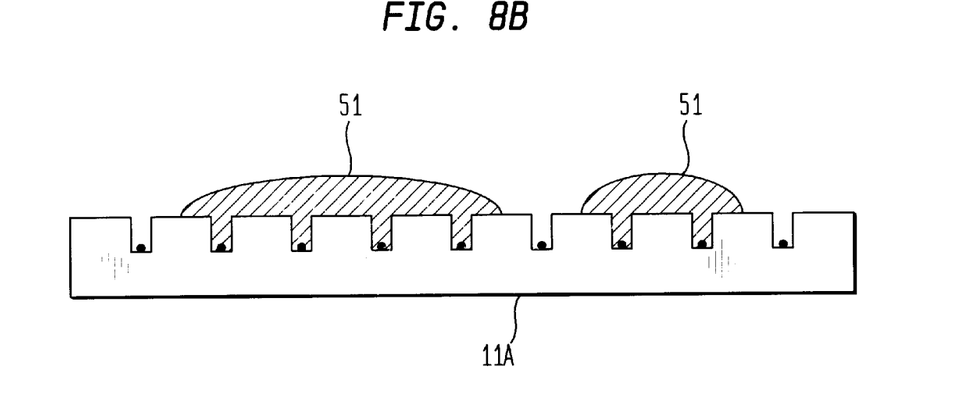
Figure 8C:
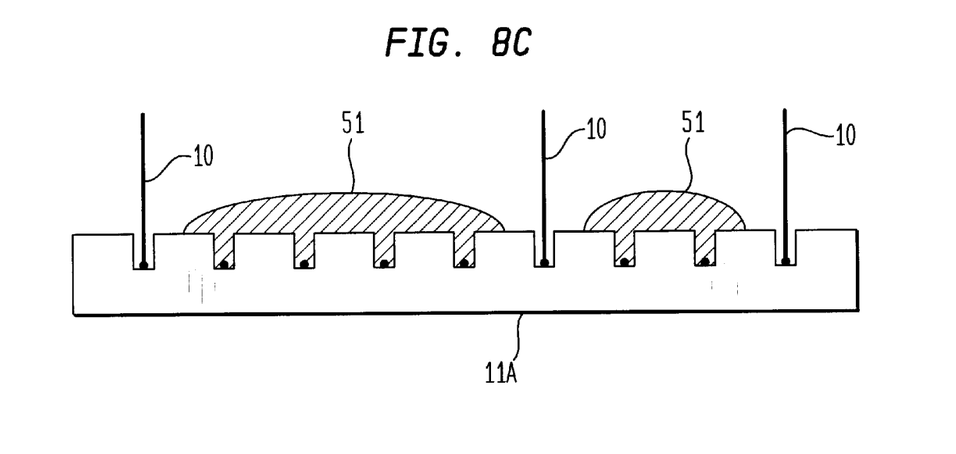

Undesirably excessive filling of catalyst particles in the pores can occur by either excessive pore filling or by doping of highly porous ceramic or glass material. FIG. 8(a) illustrates such excessive pore filling. In such cases, partial coverage by non-catalytic films 51 can be used to reduce the nucleation density of nanoconductors. FIG. 8(b) illustrates partial coverage by a non-catalytic film 51, and FIG. 8(c) shows the resulting low density growth of nanoconductors 10.

Figure 9A:
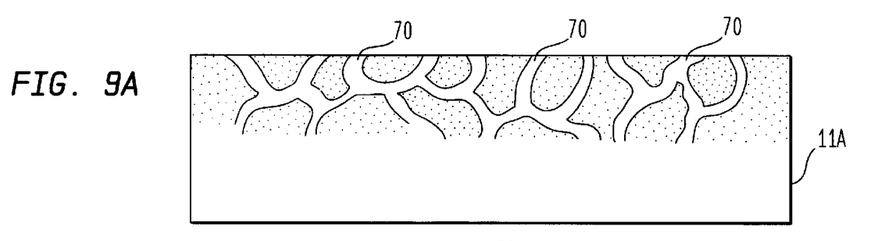
Figure 9B:
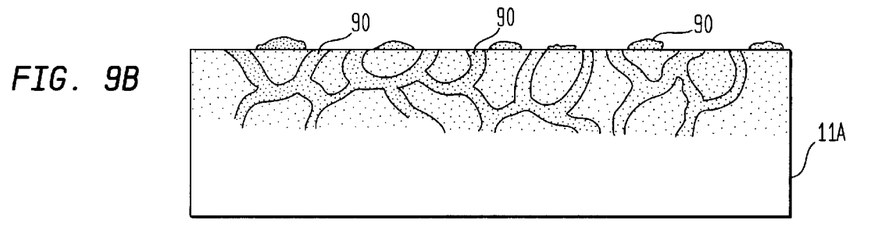
Figure 9C:
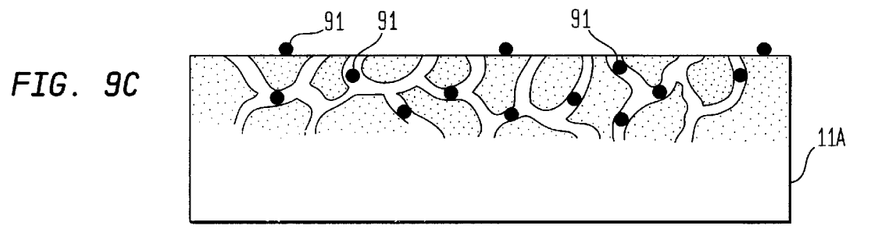
Figure 9D:
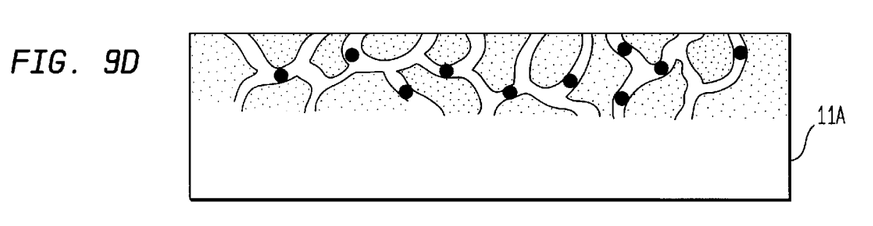
Figure 9E:
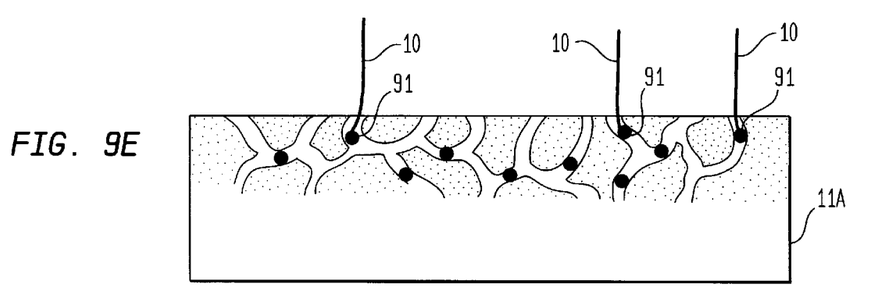

Another processing technique shown in FIGS. 9(a)–9(c) involves a porous substrate 11A (FIG. 9(a)). The nanopores 70 of the substrate are filled with a diluted solution or slurry 90, e.g., aqueous or solvent solution containing a catalyst metal (Co, Ni, Fe) in the forms of ions or slurry containing catalyst particles 40. The filling can be by spray deposition or by suction from the backside (see FIG. 9(b)). The solution or slurry 90 is then heat-treated to decompose or burn-off the matrix solution and form catalyst islands 91 within the pores (FIG. 9(c)). The surface of the porous material is then polished mechanically or ion milled to remove any excessive amount of catalyst particles and decomposition products (FIG. 9(d)). Nanoconductors 10 are then grown from the reduced number of nucleation sites dictated by the presence of catalyst particles (see FIG. 9(e)).

For certain field emission applications, the uniformity of emitter height such as the height of aligned nanoconductors is important, partly to avoid a catastrophic failure by shorting between cathode and anode or between cathode and gate, and partly to ensure maximum field-concentration and efficient electron emission from the majority of nanoconductor ends. The field-concentrating assembly structures described in FIGS. 5–9 can further be improved by trimming and equalizing the nanoconductor height, e.g., by using the method of FIG. 3(c), to within 20% variation.

II. Improved Field Emitting Devices

The improved low-density nanoconductor assemblies are useful for variety of devices, including microwave vacuum tube amplifier devices and flat panel field emission display devices. Because efficient electron emission at low applied voltages is typically improved by the presence of accelerating gate electrode in close proximity to the emitting source (typically about 1–10 $\mu$m distance), it is advantageous to have numerous gate apertures to enhance the capability of the emitter structure. Specifically, a fine-scale, micron-sized gate structure with numerous gate apertures is advantageous for attaining high emission efficiency.

Figure 10:
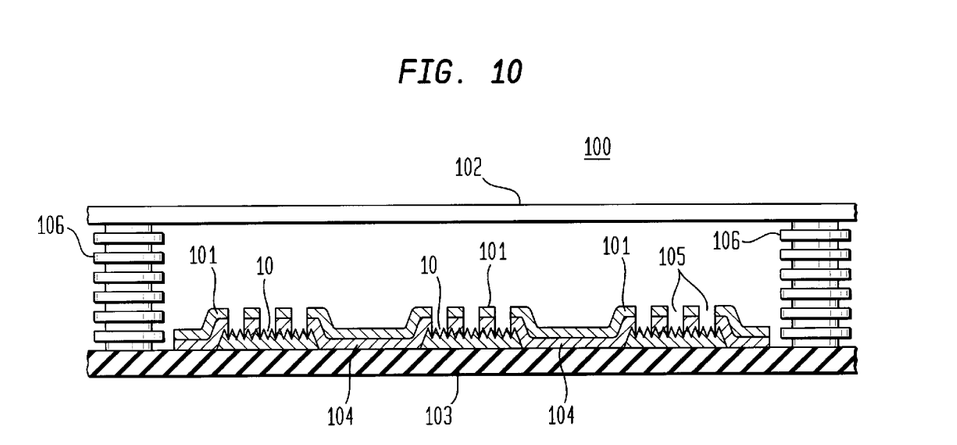
FIGS. 10–17 illustrate a variety of field emission devices using the low-density assemblies.

FIG. 10 schematically illustrates a generalized field emission device 100 comprising a low density nanoconductor assembly and a grid structure 101 formed adjacent the assembly. The grid 101 is a conductive element placed between the electron emitting assembly and an anode 102. The grid is separated from the cathode 103 but is placed sufficiently close to the nanoconductor emitter assembly to excite emissions (typically within 10 $\mu$m of the emitting nanoconductor tips). This close spacing is possible only if the emitter tips have relatively uniform height.

The grid 101 is generally separated from the cathode 103 by an electrically insulating spacer layer 104 such as aluminum oxide or silicon dioxide. Advantageously, the grid comprises an electrically conducting layer, e.g., a thin film or thin foil, with a multitude of apertures 105. Within each aperture, a multiplicity of nanoconductors 10 emit electrons when a field is applied between the cathode and the grid. Insulating spacers 106 keep the anode and cathode spaced apart.

The dimension of the grid apertures 105 is typically in the range of 0.05–100 $\mu$m in average maximum dimension (e.g., diameter), advantageously at least 0.1 $\mu$m, and more advantageously at least 0.2 $\mu$m for ease of manufacturing. The average maximum dimension is advantageously no more than 20 $\mu$m, more advantageously no more than 5 $\mu$m in order to increase the density of grid apertures and to reduce the voltage necessary to achieve electron emission. Circular apertures are advantageous in that they provide a desirable collimated electron beam with relatively low perpendicular momentum spread. The thickness of the grid conductor is typically in the range of 0.05–100 $\mu$m, advantageously 0.05–10 $\mu$m. The grid conductor material is typically chosen from metals such as Cu, Cr, Ni, Nb, Mo, W or alloys thereof, but the use of conductive ceramic materials such as oxides, nitrides, and carbides is also possible. The apertured (or perforated) grid structure is typically prepared by conventional thin film deposition and photolithographic etching. Advantageously the grid is a high density apertured gate structure such as described in U.S. Pat. Nos. 5,681,196 and 5,698,934, which are hereby incorporated herein by reference. The combination of very fine nanoconductor emitters with a high-density gate aperture structure is particularly advantageous.

Such a high density gate aperture structure is conveniently formed using the particle mask techniques described in the aforementioned U.S. Pat. No. 5,681,196. Specifically, after formation of the nanoconductor emitter structure, mask particles (metal, ceramic, or plastic particles typically having maximum dimensions less than 5 $\mu$m and advantageously less than 1 $\mu$m) are applied to the emitter surface, e.g., by spraying or sprinkling. A dielectric film layer such as $SiO_2$ or glass is deposited over the mask particles as by evaporation or sputtering. A conductive layer such as Cu or Cr is then deposited on the dielectric while maintaining the mask particles in place. Because of the shadow effect, the emitter areas underneath each mask particle have no dielectric film. The mask particles are then easily brushed or blown away, leaving a gate electrode having a high density of apertures.

Figure 11:
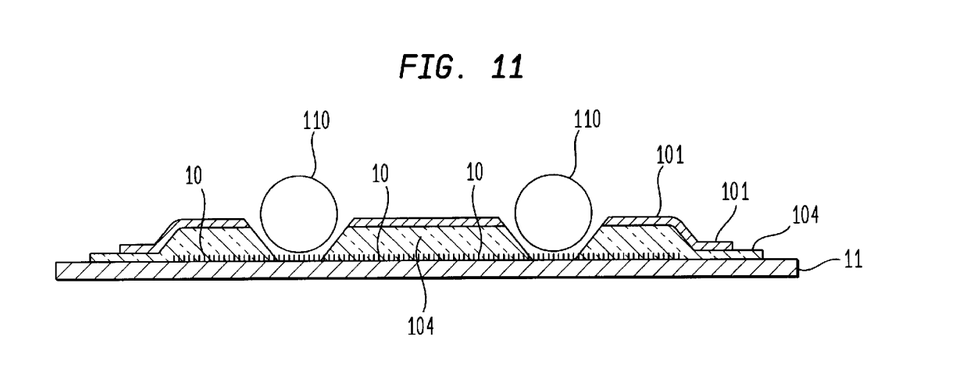

FIG. 11 illustrates fabricating an emitter grid structure using the such a particle mask technique. The mask particles 110 are located above the protruding nanoconductor emitters 10. Upon deposition of the insulating layer 104 and the grid conductor layer 101, the mask particles 110 block portions of the nanoconductor emitters 10. When the mask particles 110 are removed, nanoconductors 10 are exposed through the resultant apertures. The resultant structure is then capable of being incorporated into a device.

Figure 12:
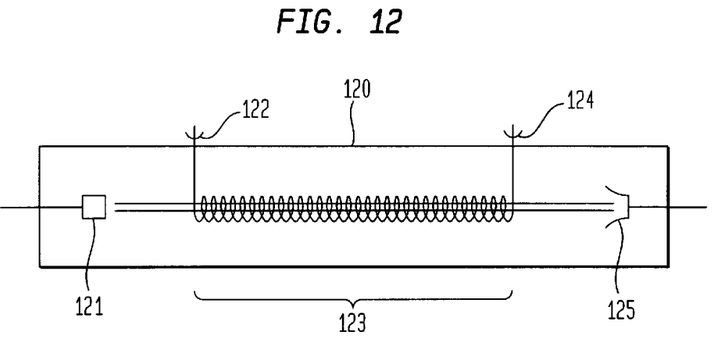

FIG. 12 is a schematic cross section of a microwave vacuum tube amplifier device—here a traveling wave tube (TWT) using the improved nanoconductor assemblies. The tube device contains an evacuated tube 120, a source of electrons in the form of an electron gun 121, an input window 122 for introducing a microwave input signal, an interaction structure 123 where the electrons interact with the input signal, and a microwave output window 124 where microwave power derived from the electrons is taken out of the tube. In the case of a TWT, other desired components typically include a focusing magnet (not shown) to focus the beam of electrons through the interaction structure 123, a collector 125 to collect the electron beam after the output microwave power has been generated and an internal attenuator (not shown) to absorb microwave power reflected back into the tube from mismatches in the output. For a TWT, the interaction region 123 is typically a conductive helix for broadband applications and a coupled-cavity region for high power applications. The electron gun 121 is an electron source that generates, accelerates and focuses an electron beam to follow a desired trajectory after it leaves the gun.

Figure 13:
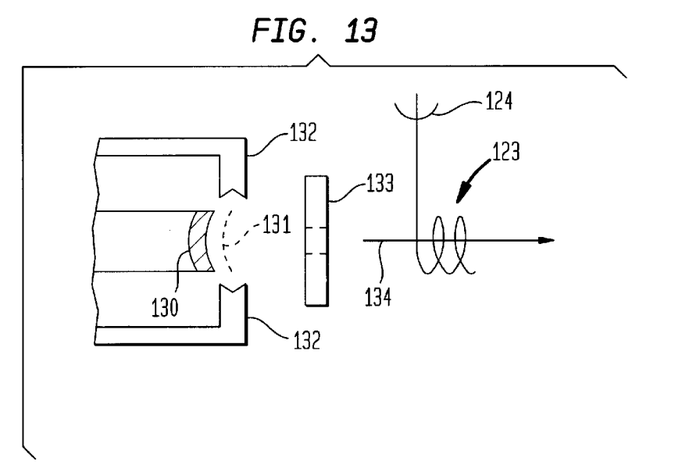

FIG. 13 schematically illustrates a conventional electron gun comprising a thermionic cathode 130, one or more grids 131 for inducing emission of electrons, focusing electrodes 132 for focusing the electrons into a beam, and-apertured anode 133 for further directing the beam 134 into interaction structure 123. For TWT applications, a long, thin electron beam at relatively low voltage and high current density is advantageous. Electron guns range in configuration from a planar cathode faced by a planar anode to more elaborate designs such as Pierce guns, conical diode electrodes, concentric cylinders or spherical cap cathodes.

The cathode 130 and grid 131 are the source of electrons for the electron beam in the TWT of FIG. 12. The cathode advantageously has the following properties and capabilities: (1) exhibit a surface able to emit electrons freely without the necessity of external excitation such as heating or bombardment, (2) supply a high current density, (3) long operating life with its electron emission continuing substantially unimpaired, (4) allow production of a narrow beam with a small spread in electron momentum, and (5) allow production of a modulated electron beam at or near the cathode. In contrast to conventional thermionic cathodes, cold cathodes comprising improved nanotube emitter assemblies exhibit these properties. Specifically, nanoconductor-based cold cathodes are capable of fast, room-temperature emission when an electric field is applied. They allow the production of a modulated electron beam over a distance of a few microns (as in the case of beam modulation performed directly by the grids), permitting the use of a shortened interaction region in the TWT tube design and resulting in a lighter, more compact device.

In operation of the device shown in FIGS. 12 and 13, an electron beam 134 is accelerated from the cathode 130 by high voltages applied to grids 131 and anode 133. The electron beam is then shot into the interaction structure 123 where it interacts with the microwave input signal such that the beam 134 is amplified as the electrons and the signal travel together through the interaction structure 123. The electrons advantageously travel at the same velocity as the microwave signal on the interaction structure 123. The power of the input signal modulates the electron beam 134, and the modulated electron beam 134 generates an amplified form of the input signal at the output 124.

When using nanoconductor-based cold cathodes in microwave vacuum tube devices, it is desired to keep electron beam spread within a reasonable level. Electrons emerge from the cathode surface with a nonzero velocity and at various angles to the surface normal. The field-emitted electrons thus have a distribution of momentum values in the direction of electron beam trajectory. These effects—random emission of electrons, undesirable momentum perpendicular to the path from the cathode to the anode and the resulting crossing of electron trajectories on the microscopic scale—all reduce the performance of the microwave amplifier by giving rise to shot noise as well as the minimum diameter that a convergent beam can attain. It is therefore desirable to inhibit electron beams from different apertures in the grid from merging unless the electron beams are nearly parallel. Specifically, if the beams merge while individually diverging, the phase space density of the resultant beam will be lowered, because at any given point electrons are found with a variety of different momenta.

It is possible to reduce the divergence angle of the electrons from each aperture by creating an electrostatic lens in the aperture. However, Liouville's Theorem constrains the extent to which a lens is able to reduce the perpendicular momentum spread. If the emitting area is equal to the lens aperture, then no substantial improvement is obtained. If the emitting area is smaller than the lens aperture, it is possible to reduce the perpendicular momentum distribution (with proper lens design) by the ratio of the radius of the emitting area to the radius of the lens.

It is therefore desirable to allow emission only from small spots near the center of each aperture, i.e. at most 70% of the area and advantageously at most 50% of the area of the aperture. It is possible to control the emission by patterning the substrate so that for a plurality of the emitting apertures, only a small area (smaller than the aperture area) is electrically conductive. It is also possible to control emission by controlling the nanoconductor incorporation process such that only the central area within the emitting aperture is activated and emits electrons, e.g., by depositing a non-emissive overlayer on the nanoconductor emitters everywhere but at the center of the apertures.

Figure 14:
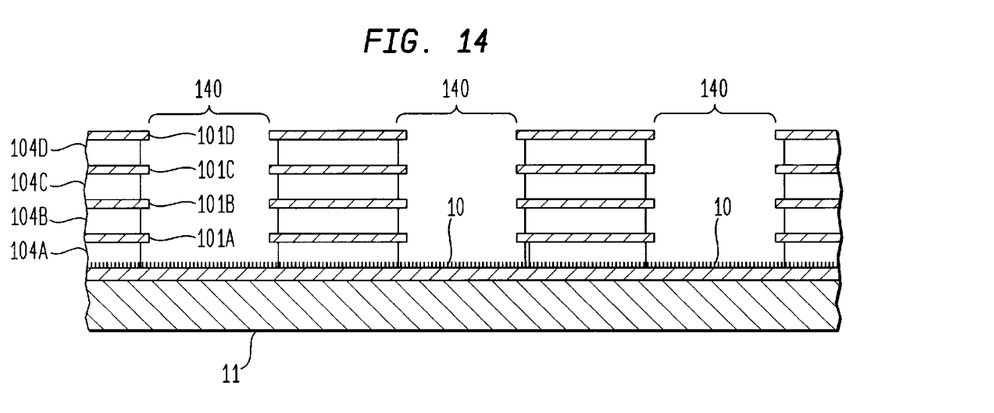

The invention provides an improved technique for reducing the divergence angle. According to the invention, a multilayer, apertured grid is used in which the first grid is operated at a negative potential. The multilayer grid structure has at least two layers and advantageously at least 4 layers of grid conductors, as illustrated in FIG. 14. Grid conductors 101A, 101B, 101C, 101D are separated by insulators 104A, 104B, 104C, 104D, and define aligned apertures 140. Nanoconductor emitters 10 located within each aperture 140 are supported by a cathode conductor 141, which is located on a substrate 11. The grid conductors 101A–101D allow the electron beams to be focused during traveling. The first grid layer closest to the emitters (101A) is generally biased negative to reduce the perpendicular momentum through suppression of field emission near the edge of the grid apertures 140. A negative bias on the first grid also focuses a diverging electron beam into one that has momenta more nearly parallel to the surface normal. (A single grid provides similarly useful properties if the field applied by the anode is sufficiently large to force emission even in the presence of negative charged grid. However, multiple grids are advantageous in reducing the required voltage on the anode, and in providing a better collimated electron beam.)

The first grid is typically 0.05 to 10 of its average maximum aperture dimension (e.g., diameter in the case of round apertures) above the cathode, advantageously 0.3 to 2. Typically, the apertures are round and have a diameter of 0.05 to 100 $\mu$m, advantageously at least 0.1 $\mu$m, more advantageously at least 0.2 $\mu$m. This first grid reduces the electric field at the cathode surface, near the edge of the hole, and thereby suppresses emission preferentially from the edge. Successive grids typically exhibit positive voltages relative to the cathode.

The multilayered grid structure can be prepared by conventional thin film deposition and photolithographic techniques. It is also possible to prepare the grid structures of FIG. 14 by a particle mask technique as discussed previously and illustrated in FIGS. 15 and 16. The thickness of the grid conductor layers 101A–101D is typically in the range of 0.05 to 100 $\mu$m, advantageously 0.1 to 10 $\mu$m. The grid conductor layers are generally selected from a metal such as Cu, Cr, Ni, Nb, Mo, W, or alloys thereof, but the use of conductive ceramics such as oxides, nitrides, and carbides is also possible. The insulator layers 104A–104D are typically formed from materials such as silica or glass.

Figure 15:
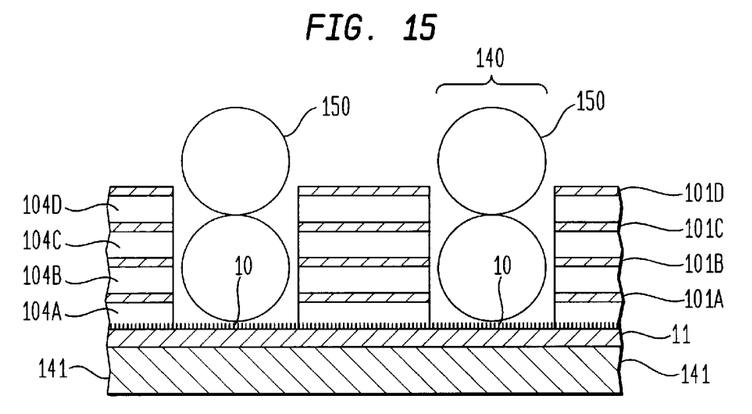

In FIG. 15, the mask particles 150 are typically ferromagnetic (e.g. Fe, Ni, Co, or their alloys). Desirable particle size is typically in the range of 0.1–20 μm in average diameter. During the placement of the particles, e.g. by sprinkling onto the nanotube emitter structure, a vertical magnetic field is applied, which causes the ferromagnetic particles 150 to form a vertically elongated chain-of-spheres containing at least 2 particles. Some chains-of-spheres may have more particles than others, but this does not affect the process of depositing the multilayer grid structure. After alternating deposition of insulating spacer film (104A–104D) and the grid conductor film (101A–101D) into multilayer stacks, the magnetic field is removed. The ferromagnetic particles 150 are then also removed, e.g., by magnetically pulling away from above using a permanent magnet or electromagnet, or by chemical etching.

Figure 16:
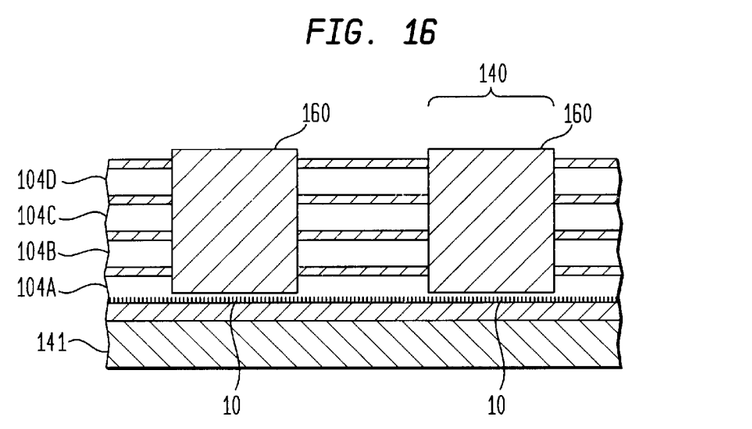

An alternative particle mask approach is schematically illustrated in FIG. 16. In this approach, elongated or prolate ferromagnetic particles 160 are sprinkled in the presence of vertical magnetic field so that they stand up vertically due to shape anisotropy and to serve as mask particles during the subsequent deposition of the multilayer grid structure (100A–100D and 101A–101D), conductor layer 11 and nanoconductor emitters 10. For convenience, the conductor/nanoconductor assembly can be supported on a larger substrate 141.

The elongated mask particles 160 typically have an average axial maximum dimension, e.g., diameter, in the range of 0.1–20 μm, and a length to diameter aspect ratio of at least 2. It is possible to prepare the particles 160, for example, by thin film deposition (e.g. by sputtering, evaporation, electroless plating) of the mask material through a perforated template (not shown) placed at a desired height above the nanoconductor emitter layer. Suitable materials for this type of elongated mask particles 160 include metals such as Cu, Al, Ni, easily water or solvent dissolvable polymers (e.g., polyvinyl acetate, polyvinyl alcohol, polyacrylamide, acrylonitrile-butadiene-styrene or ABS), volatile polymers (e.g., PMMA), or easily dissolvable salts (e.g., NaCl). After deposition of the particles, the template is removed, and the multilayer grid structure is formed by deposition over the mask particles. The mask particles are then dissolved away to expose the aperture.

The cathode and gate structure of FIG. 14, as used in a microwave amplifier, is not necessarily flat in surface geometry. It is possible to use a reshaped bulk nanoconductor composite emitter, or a curved substrate having thin film array emitters deposited thereon. The curved substrate is prepared, for example, by etching or mechanical polishing (e.g., in the case of materials such as Si) or by plastic deformation (e.g., in the case of ductile metals such ad Cu, Mo, Nb, W, Fe, Ni, or alloys thereof).

Advantageously, the nanoconductor-containing cathode and multilayer grid structure of FIG. 14 is used in a TWT, instead of a thermionic emission cathode. Also, the cathode/grid structure of FIG. 14 is advantageously slightly concave for the purpose of focusing the emitted electrons into a beam.

The nanoconductor emitter structures of FIGS. 13 and 14, reduce the perpendicular momentum spread of electrons emitting from the cathode due to four features. (1) Low voltage emission is conducive to reduced beam spreading. If the emitter geometry is held constant, the perpendicular momentum spread scales as the square root of the emission voltage. The use of field-concentrating, low-density protruding nanotube emitters prepared according to the invention allows low voltage emission and hence reduced perpendicular momentum in microwave amplifier operation. (2) Electron emission is restricted to the central area portion, which is much smaller than the entire grid aperture area. (3) The electron beam is focused by the stack of the multilayer grid structure. (4) A concave substrate further focuses the electron beam.

It is also possible to use the nanoconductor-based emitters of the invention to fabricate a flat panel, field emission display. Such a field emission display is constructed, for example, with a diode design (i.e., cathode-anode configuration) or a triode design (i.e., cathode-grid-anode configuration). Advantageously, a grid electrode is used, more advantageously a high density aperture gate structure placed in proximity to the nanoconductor emitter cathode, as discussed previously.

For display applications, emitter material (the cold cathode) in each pixel of the display desirably consists of multiple emitters for the purpose, among others, of averaging out the emission characteristics and ensuring uniformity in display quality. Because of the nanoscopic nature of the nanoconductors, the emitter provides many emitting points, typically more than $10^4$ emitting tips per pixel of 100×100 $\mu m^2$, assuming 0.01–1% areal density of nanoconductors with a tubular diameter of 5–100 μm. Advantageously, the emitter density in the invention is at least $1/\mu m^2$, more advantageously at least $10/\mu m^2$. Because efficient electron emission at low applied voltage is typically achieved by the presence of accelerating gate electrode in close proximity (typically about 1 micron distance), it is useful to have multiple gate apertures over a given emitter area to utilize the capability of multiple emitters. It is also desirable to have fine-scale, micron-sized structure with as many gate apertures as possible for increased emission efficiency.

Figure 17:
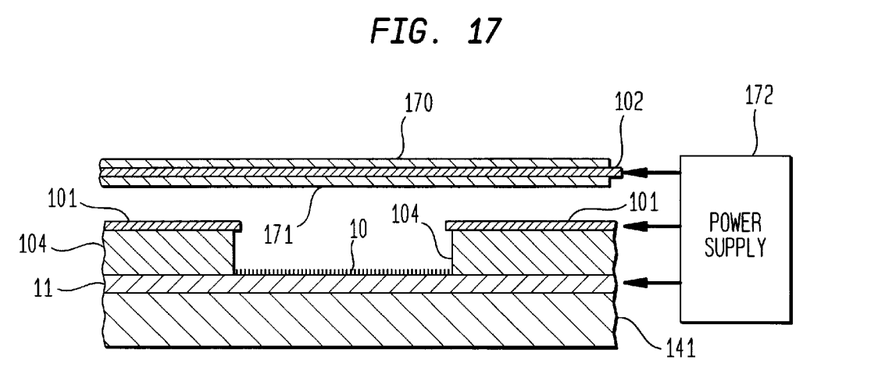

FIG. 17 illustrates a flat panel field emission display using a nanoconductors emitter structure of the invention. The display contains a cathode 11 including a plurality of nanoconductor emitters 10 and an anode 102 disposed in spaced relations from the emitters 10 within a vacuum seal. The anode conductor 102 formed on a transparent insulating substrate 170 is provided with a phosphor layer 171 and mounted on support pillars (not shown). Between the cathode and the anode and closely spaced from the emitters is a perforated conductive gate layer 101. Conveniently, the gate 101 is spaced from the cathode 11 by an insulating layer 104.

The space between the anode and the emitter is sealed and evacuated, and voltage is applied by power supply 172. The field-emitted electrons from the nanoconductor emitters 10 are accelerated by the gate electrode 101, and move toward the anode conductor layer 102 (typically a transparent conductor such as indium-tin oxide). As the accelerated electrons hit the phosphor layer 171, a display image is generated.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In an assembly of nanoscale conductors comprising a substrate and a plurality of nanoscale conductors attached to the substrate, the conductors extending from a substrate surface to tips and having diameters in the range 1.0–100 nm and lengths in the range 0.5–100 μm;

the improvement wherein the average separation distance between adjacent nanoscale conductors is in the range 0.1 to 2.5 times the average conductor height above the surface.

2. The assembly of claim 1 wherein the nanoscale conductors are carbon nanotubes.

3. The assembly of claim 1 wherein the nanoscale conductors are semiconductor nanowires.

4. The assembly of claim 1 wherein the substrate surface is planar and the conductors are substantially perpendicular to the planar surface with an average deviation of alignment less than 30° from the perpendicular.

5. The assembly of claim 1 wherein the conductors are substantially equal in height to within 20% of the average height.

6. In an electron field emitting device comprising a cathode, a plurality of field emitter tips, a grid spaced relatively close to the emitter tips and an anode spaced relatively farther from the tips, the improvement wherein the field emitting device comprises the assembly of claim 1 with the substrate of the assembly comprising the cathode and the tips of the conductors comprising the emitter tips.

7. In a microwave vacuum tube amplifier comprising an evacuated tube, a source of electrons within the tube, an input for a microwave signal, an interaction structure within the tube for interacting the input signal with electrons and an output for an amplified microwave signal;

the improvement wherein the electron source comprises a field emitting device according to claim 6.

8. In a display device comprising a cathode including a plurality of electron emitters, an anode disposed in spaced relation to the emitters, the anode including a phosphor layer, and a gate disposed between the emitters and the anode, the improvement wherein the display device comprises the assembly of claim 1 with the substrate of the assembly comprising the cathode and the tips of the conductors comprising the emitters.

* * * * *